(No Model.)  3 Sheets—Sheet 1.
J. B. DAVIS.
SOLAR AND TRANSIT INSTRUMENT.
No. 575,215. Patented Jan. 12, 1897.
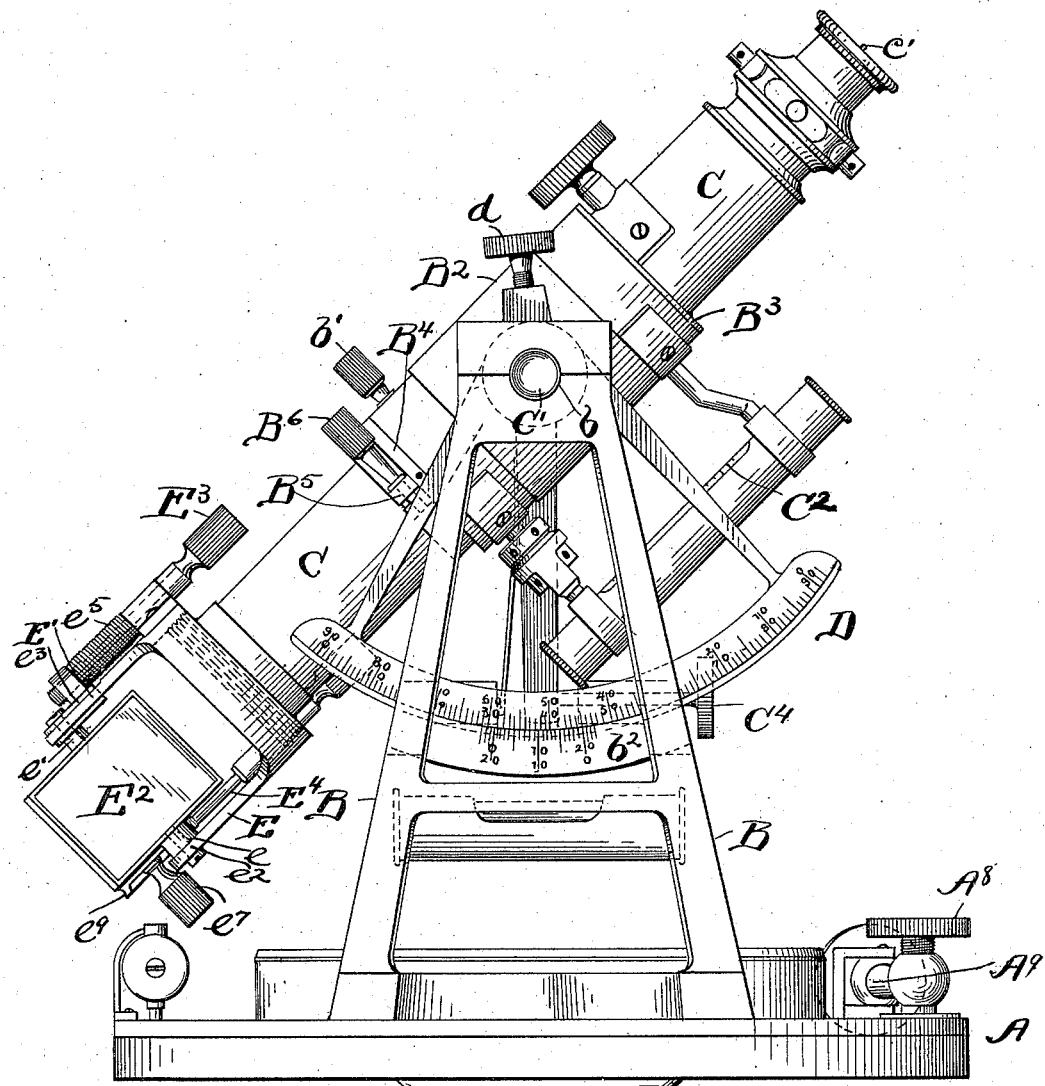
Fig. 1.
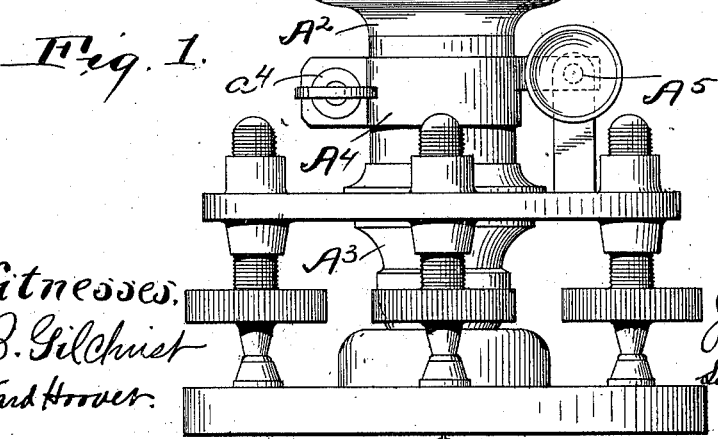
Witnesses:
E. B. Gilchrist
S. Ward Hoover
Inventor:
John B. Davis.
By Leggett, Lynch, Doer & Donnelly
his Attorneys.

(No Model.) 3 Sheets—Sheet 2.
J. B. DAVIS.
SOLAR AND TRANSIT INSTRUMENT.

No. 575,215. Patented Jan. 12, 1897.

Witnesses
E. B. Gilchrist
S. Ward Hoover

Inventor
John B. Davis
By Beggett, Synch, Dover & Donnelly
his Attorneys (No Model.) 3 Sheets—Sheet 3.

J. B. DAVIS.
SOLAR AND TRANSIT INSTRUMENT.

No. 575,215. Patented Jan. 12, 1897.

Witnesses.
E. B. Gilchrist.
L. Ward Hoover.

Inventor.
John B. Davis.
By Leggett, Lynch, Doer & Donnelly
his attorneys.

UNITED STATES PATENT OFFICE.

JOHN B. DAVIS, OF CLEVELAND, OHIO.

SOLAR AND TRANSIT INSTRUMENT.

SPECIFICATION forming part of Letters Patent No. 575,215, dated January 12, 1897.

Application filed January 6, 1896. Serial No. 574,464. (No model.)

*To all whom it may concern:*

Be it known that I, JOHN B. DAVIS, of Cleveland, Cuyahoga county, Ohio, have invented certain new and useful Improvements in Solar and Transit Instruments; and I do hereby declare the following to be a full, clear, and exact description of the invention, such as will enable others skilled in the art to which it pertains to make and use the same.

My invention relates to improvements in that class of engineers' and surveyors' transits known as "combined solar and engineers' and surveyors'" transits.

Figure 2:
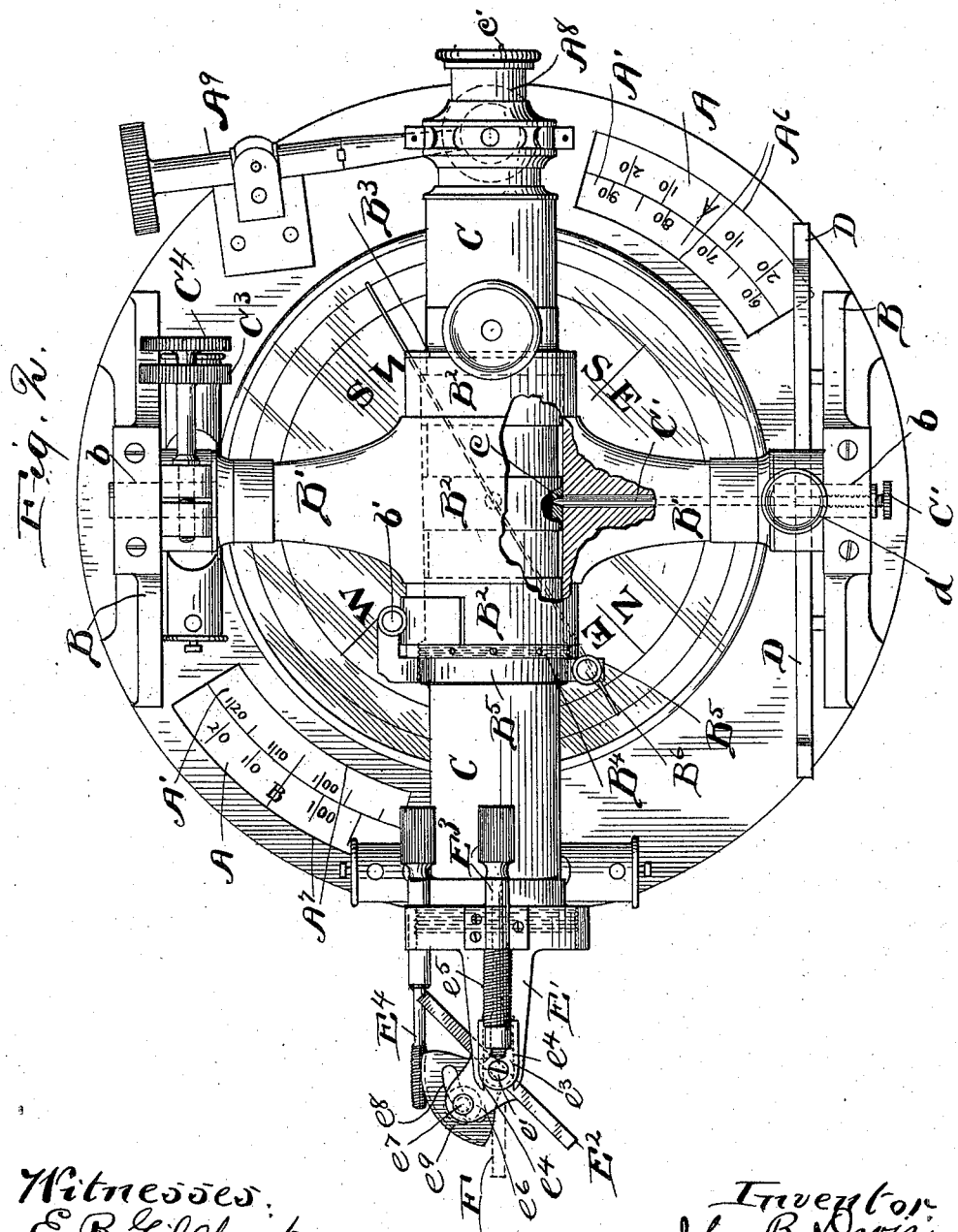
Figures 3, 4, 5:
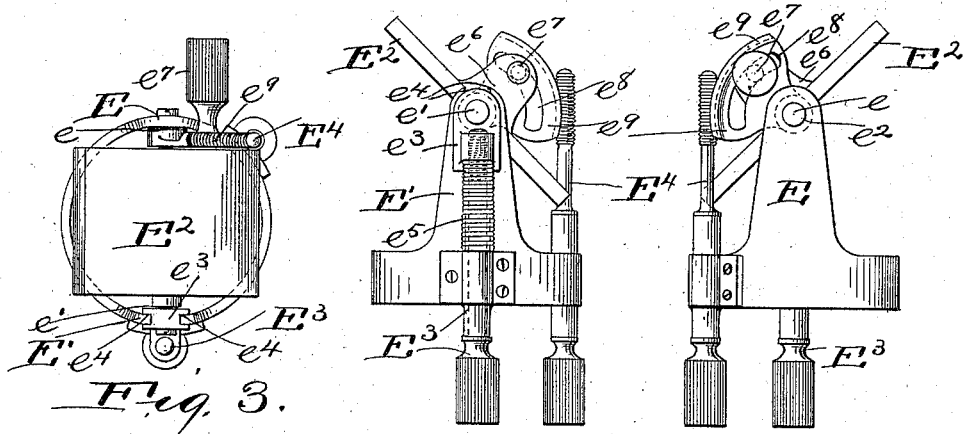
Figure 6:
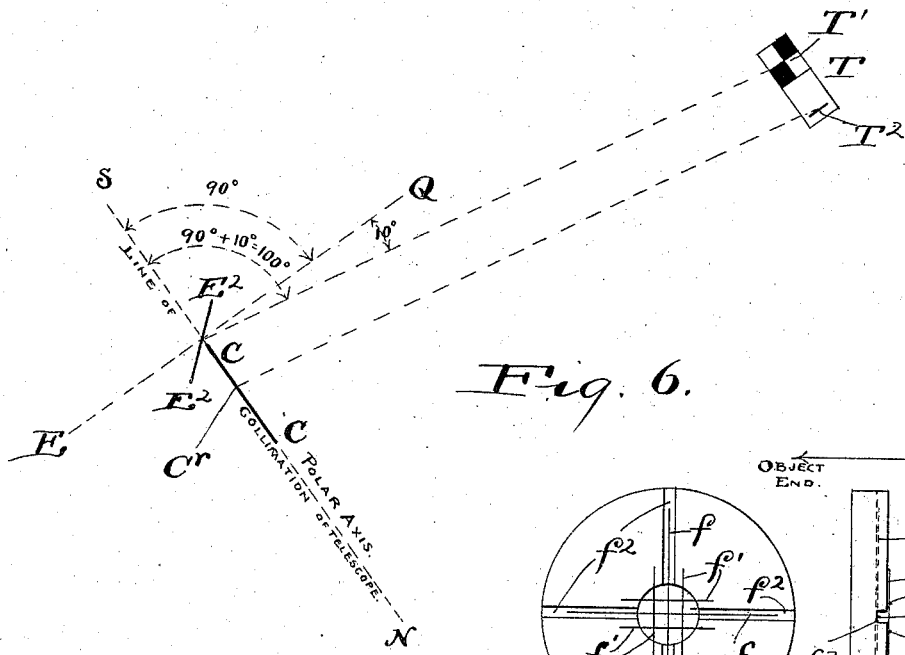
Figures 7, 8:
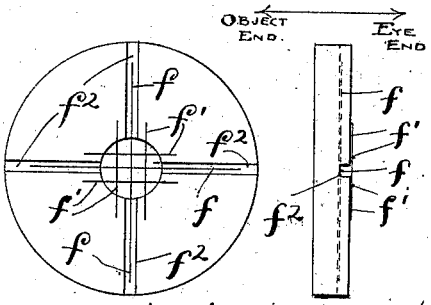

In the annexed drawings, which form a part of this specification, and in which the same reference-letters indicate the same parts, Figure 1 represents a side elevation of a solar transit embodying my invention; Fig. 2, a plan view of the instrument; Fig. 3, an end view of the reflector device; Fig. 4, a view of the same from one side; Fig. 5, a view of the device from the opposite side; Fig. 6, a diagram illustrating the method of obtaining the proper adjustment of the instrument; and Figs. 7 and 8 are enlarged face and edge views, respectively, of the cross-hair diaphragm for the telescope.

The horizontal limb of the instrument consists of two revolving plates A and A', the lower plate A' of which has the graduated circle and is journaled to revolve in a horizontal plane upon a spindle $A^2$ in a socket $A^3$ upon the tripod-head. Said spindle may be secured in position by a clamp $A^4$, having a clamp-screw $a^4$ and a tangent-screw $A^5$, by means of which more delicate adjustment may be made than by manually turning the plate. The upper plate rotates upon the lower plate and has segmental slots $A^6$ and $A^7$ at diametrically opposite points, through which the graduated circle of the lower plate may be read and horizontal angles accurately determined by means of a vernier. The upper plate may be secured in position upon the lower plate by means of a clamp-screw $A^8$, and may receive its ultimate accurate adjustment by a tangent-screw $A^9$. Standards B B are secured upon the upper plate, and said standards have bearings $b$ for the trunnions of a transverse axis B', formed at its middle with a sleeve $B^2$, within which a telescope C is journaled. Collars $B^3$ and $B^4$, secured upon the telescope C, bear against the ends of the sleeve $B^2$ and prevent longitudinal movement of the telescope. A clamp $B^5$, having clamp-screw $B^6$, is provided for clamping the telescope from rotation upon its longitudinal axis, and said clamp is also provided with a tangent-screw $b'$ for delicate rotation of the telescope. A screw-rod C' passes through a trunnion and the axis of the telescope, and the inner end of said rod engages a hole $c$ in the side of the telescope-tube for the purpose of retaining said tube from rotation when the instrument is used as an engineer's and surveyor's transit. The telescope has the usual spirit-level $C^2$ and is provided with a clamp-screw $C^3$ and a tangent-screw $C^4$ for delicate adjustment in determining its horizontal position. The usual vertical or latitude arc D is secured to the axis of the telescope by a clamp-screw $d$, and is read in its relation to the vernier $b^2$, and is operated for fine adjustment by the telescope-axis clamp and tangent. Two brackets E E' project at approximately diametrically opposite points from the object end of the telescope, being either integral with the same or, as illustrated in the drawings, extending from a collar secured upon the telescope-tube.

A reflector $E^2$ has trunnions $e$ and $e'$ projecting at opposite points, and one of said trunnions $e$ has limited universal play in a bearing $e^2$ in the bracket E, while the other trunnion $e'$ is journaled in a bearing-block $e^3$, which has longitudinal sliding play in a slot $e^4$ at the end of the bracket E'. An adjusting-screw $E^3$ is journaled parallel with said bracket and has its end threaded in a lug projecting from the bearing. A spring $e^5$ surrounds the screw and bears against said lug and the bearing for the screw, so as to compensate for any loose play of the screw. An ear $e^6$ projects from the back of the reflector and has a clamp-screw $e^7$, which passes through, has play in, and may clamp a segmental slot $e^8$ in a segment-arm $e^9$, fulcrumed upon one reflector-trunnion. The edge of said segment-arm has cogs or threads which are engaged by a tangent-screw $E^4$. The reflector may therefore be tilted with its plane at any angle to the axial line or line of collimation of the telescope, whereupon the ear upon the reflector and the segment-arm may be clamped together, and final accurate adjustment may be made by means of the tangent-screw.

The hairs of the diaphragm are so arranged that the latter may support the central hairs $f$, as well as the solar cross-hairs $f'$. This is accomplished by placing the central hairs in the bottoms of grooves $f^2$ in the diaphragm and fastening the solar hairs upon the face of the diaphragm, and in this manner one set of hairs will be visible only at a time, as the other set of hairs will be thrown out of focus and will be invisible when the eyepiece is adjusted to focus the one set. Thus the central hairs may be used in ordinary work and the solar hairs in solar work.

A shaded-glass slide for use when observing sun is placed at eyepiece end of telescope and is operated by thumb-knob $c'$.

To admit of the use of a transit and reflector for solar work with the proper degree of exactitude, it is of the utmost importance that the plane of the reflector shall be truly at right angles to the line of collimation and be so maintained during each observation.

The trunnion adjustment for the reflector which I provide, and the practical operation of which I will hereinafter describe, enables the operator to attain the required correctness and to make his corrections before making each observation.

I will now describe the method of operating my improved instrument, and in this connection reference is made to Fig. 6, in which diagram, N S represents the line of collimation of telescope, as well as polar axis; E Q, the equator; C C, the transit-telescope; $E^2 E^2$, the reflector; C$r$, the center of transit-telescope, and T the target. It will be observed that T' $T^2$ = C C$r$, and that the optical axis of telescope C C, target-center T', and image of the same in reflector $E^2 E^2$ are all in the same horizontal plane when target-image is thrown into line of collimation.

All instrumental adjustments of the several parts of the transit instrument are first made and the telescope is horizontally leveled. The telescope is now sighted against a target T, (see Fig. 6,) the horizontal center line of which lies in the horizontal plane with the optical axis of the telescope. With the horizontal limb of the instrument set preferably at zero (as a convenience only in reading the angle) the telescope is now sighted to a point as much to one side of the target T as the center of the telescope-axis is back of the intersection of the reflector-plane and optical axis of the telescope. This is done for the purpose of allowing for parallax due to the distance between the reflector-plane and the center of transit-telescope. If an object can be found which is in a horizontal plane with the optical axis of the telescope and at such distance as to eliminate parallax, it may be sighted to direct. The telescope being level, it is now horizontally turned through an arc of ninety degrees, plus or minus the corrected declination of the sun at the time of observation, according to whether the sun is north or south of equator. In the diagram this declination-angle is indicated as ten degrees north. The reflector is now so turned that it will show the center of the target in the line of collimation of the instrument. This adjustment is accomplished by adjustment of the axis of revolution of the reflector by means of the sliding bearing and the segment adjustment of the reflector. When the central lines of the target coincide with the central hairs of the telescope-diaphragm, the reflector is accurately adjusted to have its vertical plane at right angles to the line of collimation and to stand at an angle of forty-five degrees, plus or minus one-half of the corrected declination of the sun, to the optical axis of the telescope, with said latter adjustment accomplished by readings entirely upon the horizontal limb of the instrument, where the required accuracy is easily obtained. When the reflector has been thus adjusted, the telescope may be dipped and adjusted to an angle equal to the latitude of the place of observation. The screw-rod C' is withdrawn, allowing telescope to rotate upon its optical axis, and the center of the instrument is unclamped, so that horizontal movement is allowed. When the object end of the telescope has been pointed south, the telescope is revolved in its sleeve and the transit upon its center until the sun's image appears in the square of the solar hairs of the diaphragm, for which the eyepiece is now focused. The telescope will now be in the true meridian, and the horizontal limb may be clamped so as to fix the same. Revolve the telescope in its sleeve until it is in its normal position for engineering or surveying work, where it is held by screw-rod C', and thereupon unclamp the telescope-axis, so that the true meridian may be suitably marked by points in the optical axis of the telescope. For this work the reflector may be either removed or turned in a line with the optical axis of the telescope, as shown at F.

When it is desired to determine the latitude of a place, the reflector is first placed or adjusted in the same manner as above described for determining the true meridian. The telescope is then rotated until the vertical solar hairs have become horizontal, whereupon the telescope is dipped and the sun is followed until it has attained its greatest altitude, when the latitude may be read from the vertical arc.

The telescope has a fixed object end, and is constructively placed central, so that the line of collimation is adjusted on a fixed point by revolving telescope in its sleeve, and as line of collimation in this solar construction represents the polar axis, the reflector revolving with the telescope, there are no solar adjustments required to be maintained, as the reflector is placed in proper relative position each time a solar observation is made.

Instead of the perpendicular reflector-adjustment construction herein described two standards might be provided, both having a fixed length and carrying the reflector-axis, said standards being so mounted on the end of the telescope as to admit of their having sufficient rotative motion to enable reflector-plane to be brought to a position perpendicular to line of collimation.

While I have here illustrated and described the form which I consider the best form of my invention, other forms may be made within the spirit of my invention and embodying the principles set forth in the following claims.

What I claim is—

1. In a combined solar and transit instrument a single telescope the optical axis of which is the polar axis of the instrument in determining the true meridian in combination with a solar attachment revoluble with said telescope around said optical axis, substantially as and for the purposes set forth.

2. In a combined solar and transit instrument of the variety described in which the optical axis of the transit-telescope is the polar axis of the instrument in determining the true meridian, the combination with a telescope adapted to be revolved upon its optical axis of a reflector supported upon an axis transverse to said optical axis and arranged to revolve with said telescope, substantially as and for the purposes described.

3. In a solar and transit instrument, the combination with a telescope adapted to revolve on its axis, of a reflector capable of being revolved upon an axis transverse to the optical axis of the telescope, and means substantially as described for adjusting said reflector-axis in its angular relation to the telescope-axis, substantially as described.

4. In a solar and transit instrument, the combination with a telescope adapted to revolve upon its optical axis, of a reflector capable of being revolved upon an axis transverse to the optical axis of the telescope, and means for adjusting said reflector-axis in its angular relation to the telescope-axis, substantially as set forth.

5. In a solar and transit instrument, the combination with a telescope adapted to be revolved upon its optical axis, of a reflector supported upon and exterior to the object end of the telescope and capable of being revolved upon an axis transverse to the optical axis of the telescope, and means for adjusting the angle of the axis of revolution of the reflector and the plane of the same in relation to the optical axis of the telescope, substantially as set forth.

6. A solar and transit instrument provided with a telescope adapted to be revolved upon its optical axis and to be vertically dipped upon a transverse axis, a vertical limb and a horizontal limb, a level on said telescope, a reflector at the object end of the telescope, revoluble therewith, and adapted to be revolved upon an axis transverse to the optical axis of the telescope, and means for adjusting the plane of the reflector in its angular relation to the optical axis of the telescope.

In testimony whereof I sign this specification, in the presence of two witnesses, this 28th day of December, 1895.

JOHN B. DAVIS.

Witnesses:
L. WARD HOOVER,
ELLA E. TILDEN.